United States Patent
Duch et al.

(10) Patent No.: US 9,701,159 B2
(45) Date of Patent: Jul. 11, 2017

(54) LOW FRICTION SEALING DEVICE FOR A WHEEL HUB ASSEMBLY CONNECTED TO A CONSTANT VELOCITY JOINT

(71) Applicants: Daniele Duch, San Gillio (IT); Fausto Morello, Sommariva del Bosco (IT)

(72) Inventors: Daniele Duch, San Gillio (IT); Fausto Morello, Sommariva del Bosco (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/951,493

(22) Filed: Nov. 25, 2015

(65) Prior Publication Data

US 2016/0152072 A1    Jun. 2, 2016

(30) Foreign Application Priority Data

Nov. 28, 2014  (IT) .............................. TO2014A0993

(51) Int. Cl.
  *F16J 15/32*  (2016.01)
  *B60B 27/00*  (2006.01)
  (Continued)

(52) U.S. Cl.
  CPC ........ *B60B 27/0073* (2013.01); *F16C 33/768* (2013.01); *F16C 33/7823* (2013.01);
  (Continued)

(58) Field of Classification Search
  CPC ............... F16J 15/3232; F16C 33/7823; F16C 33/7876; F16C 33/7886; F16C 2326/02; B60B 27/0073
  (Continued)

(56) References Cited

U.S. PATENT DOCUMENTS

| | | | | |
|---|---|---|---|---|
| 2006/0188189 A1* | 8/2006 | Serafini | ................... | G01P 3/443 384/448 |
| 2010/0209031 A1* | 8/2010 | Kaneko | ................... | B60B 27/00 384/448 |
| 2010/0244388 A1* | 9/2010 | Nakagawa | ........... | F16J 15/3264 277/559 |
| 2013/0001888 A1* | 1/2013 | Rossi | ................... | F16J 15/3256 277/549 |

FOREIGN PATENT DOCUMENTS

| | | | |
|---|---|---|---|
| DE | 102007057962 A1 | 6/2009 | |
| DE | 102011003704 | * 8/2012 | .......... F16C 33/7886 |

(Continued)

OTHER PUBLICATIONS

Thrust—The free dictionary.*

*Primary Examiner* — Kristina Fulton
*Assistant Examiner* — Nathan Cumar
(74) *Attorney, Agent, or Firm* — Bryan Peckjian; SKF USA Inc. Patent Dept.

(57) ABSTRACT

A sealing device for a wheel hub assembly having an outer ring and an inner ring. The sealing device includes a first (stationary) annular shield and a second (rotating) annular shield, each having a journalling portion and a flange portion radially extending in cantilever fashion from the journalling portion and towards the other shield; and an annular sealing element carried by the first shield and provided with a plurality of annular sealing lips. The first shield is coupled radially on the outside of the outer ring. The second shield flange portion includes a radially outer annular stretch opposite the journalling portion, extending axially towards the first shield and is incurved radially from the exterior towards the interior, on the side opposite the first shield, forming a U-arranged parallel to a common symmetry axis of the first and second shields, having a concavity thereof facing the side opposite the first shield.

10 Claims, 2 Drawing Sheets

(51) Int. Cl.
*F16C 33/76* (2006.01)
*F16C 33/78* (2006.01)
*F16C 33/80* (2006.01)
*F16C 41/00* (2006.01)
*F16J 15/3232* (2016.01)
*F16C 19/18* (2006.01)

(52) U.S. Cl.
CPC ...... *F16C 33/7876* (2013.01); *F16C 33/7886* (2013.01); *F16C 33/805* (2013.01); *F16C 41/007* (2013.01); *F16J 15/3232* (2013.01); *B60B 27/0068* (2013.01); *F16C 19/186* (2013.01); *F16C 2326/02* (2013.01)

(58) Field of Classification Search
USPC ........................................................ 277/565
See application file for complete search history.

(56) References Cited

FOREIGN PATENT DOCUMENTS

| | | | |
|---|---|---|---|
| DE | 102012207054 A1 | 10/2013 |
| EP | 0836021 A2 | 4/1998 |
| EP | 2042755 A2 | 4/2009 |
| EP | 2043880 A1 | 4/2009 |
| EP | 2541107 A1 | 1/2013 |
| JP | 2001323942 A | 11/2001 |
| JP | 2002327769 A | 11/2002 |
| JP | 2006118553 A | 5/2006 |
| WO | 2009/140996 A1 | 11/2009 |
| WO | 2013120541 A1 | 8/2013 |

\* cited by examiner

LOW FRICTION SEALING DEVICE FOR A WHEEL HUB ASSEMBLY CONNECTED TO A CONSTANT VELOCITY JOINT

CROSS REFERENCE TO RELATED APPLICATIONS

This is a Non-Provisional patent application, filed under the Paris Convention, claiming the benefit of Italy (IT) Patent Application Number TO2014A000993, filed on 28 Nov. 2014, which is incorporated herein by reference in its entirety.

TECHNICAL FIELD OF THE INVENTION

The present invention relates to a low friction sealing device for wheel hub assemblies connected to constant velocity joints provided with a signal generating element and having in addition to a low-friction operation, a simplified structure, an improved sealing action and an improved magnetic signal.

KNOWN PRIOR ART

The wheel hub assemblies support on one side a vehicle wheel and, in the case of a driving wheel, are angularly connected to a respective constant velocity joint for the transmission of the driving torque from the drive shaft to the wheel itself. The wheel hub assemblies have an axis of rotation and comprise an inner ring and an outer ring coaxial to each other and to the axis of rotation and rotatable one with respect to the other by the interposition of two rows of rolling bodies.

The inner ring is a flanged inner ring to allow the attachment of a wheel to the assembly, and comprises:
  a flange transverse to the axis of rotation,
  a stub axle which extends along the axis of rotation and which is made in one piece and of the same material of the flange, and
  a small inner ring (also called by the acronym SIR), which is axially mounted on the stub axle axially on the opposite side of the flange with respect to the stub axle itself, and is locked axially against a shoulder of the stub axle by a rolled edge.

The transmission of the driving torque by the constant velocity joint to the wheel hub assembly is ensured by conjugated toothed means for motion transmission provided on the adjacent and facing ends of the wheel hub and of the constant velocity joint outer ring; the toothed means can be constituted by a usual grooved coupling, or by a pair of frontal toothing that couple, head to head, as shown in WO2009/140996, in EP2042755, or again in EP2043880 (published also as WO2008/006339).

In particular in a case presenting frontal toothing, the junction area between the wheel hub and the constant velocity joint must be protected from external infiltrations of contaminants (water, dust, mud, dirt); the same applies to the rolling bodies mounted interposed between the inner ring and the outer ring, which is provided with fixing means to an upright of a vehicle suspension.

The protection is obtained according to EP2043880 by means of a single sealing assembly formed by two opposite shields, a first one fixed in axial abutment on the inner ring, on the side facing the constant velocity joint, and a second one fixed within the outer ring and carrying a sealing ring provided with one or more sliding lips, which cooperate in contact with the first shield. The first shield has an axial "leg", or sleeve portion, which extends in a cantilever fashion, with a free end thereof from the inner ring of the bearing defined by the wheel hub assembly towards the outer ring of the constant velocity joint, to cover the junction area. This cantilevered portion may be provided with an annular sealing gasket, which radially cooperates in axial abutment with a shoulder of the outer ring of the constant velocity joint; moreover, the cantilevered portion, or the face of a flange portion, or "radial leg" of the first shield, facing in use the constant velocity joint, may be provided with an annular signal generating element (also called "phonic wheel"), formed, if the shield is made of ferromagnetic metallic material, by an alternation of projections and depressions, or by a seal annular portion made of elastomeric material or of magnetizable plastic base, magnetized so as to have an alternation of magnetized and non-magnetized areas, or of magnetized areas having opposite polarities. Once, in use, coupled to a suitable sensor, the "phonic wheel", which according to what has been said is integral with the inner ring of the bearing, generates a magnetic signal that, in general, is used to detect the rotation speed of the vehicle wheel.

The solution according to EP2043880 leaves a limited space available for the sensor operatively associated with the "phonic wheel", is relatively complex to assemble and may be subject, in use, to peak loads.

From EP2541107 by the same Applicant a solution is known that brilliantly overcomes all the drawbacks of the known art. However, though satisfactory, this solution involves the reduction of the radial extension of a magnetized rubber element constituting the phonic wheel with consequent possible attenuation of the magnetic signal.

SUMMARY OF THE INVENTION

The object of the present invention is to provide a sealing device for wheel hub assemblies connected to the constant velocity joints which is free from the drawbacks described above, having low operating costs and high ease of production, high protection efficiency of the rolling elements and of the coupling area between the joint and the wheel hub and reduced overall dimensions both axial and radial, but leaving more space for the sensor, so as to obtain, generated by the sensor, an always strong and reliable magnetic signal accompanied by a significant reduction of the friction generated by the sliding of the sealing ring lips on the first shield, and by a simplified assembly.

According to the invention, a sealing device for wheel hub assemblies is provided connected to constant velocity joints, as defined in the appended claims.

Further characteristics and advantages of the present invention will become clear from the following description of a non-limiting example of embodiment, provided with reference to the figures of the accompanying drawing, wherein:

FIG. 1 illustrates schematically in radial section a longitudinal view of a wheel hub assembly connected to a constant velocity joint and provided with a sealing device according to the invention; and FIG. 2 illustrates in enlarged scale and again in radial section the sealing device of the invention as a detail of FIG. 1.

Figure 1:
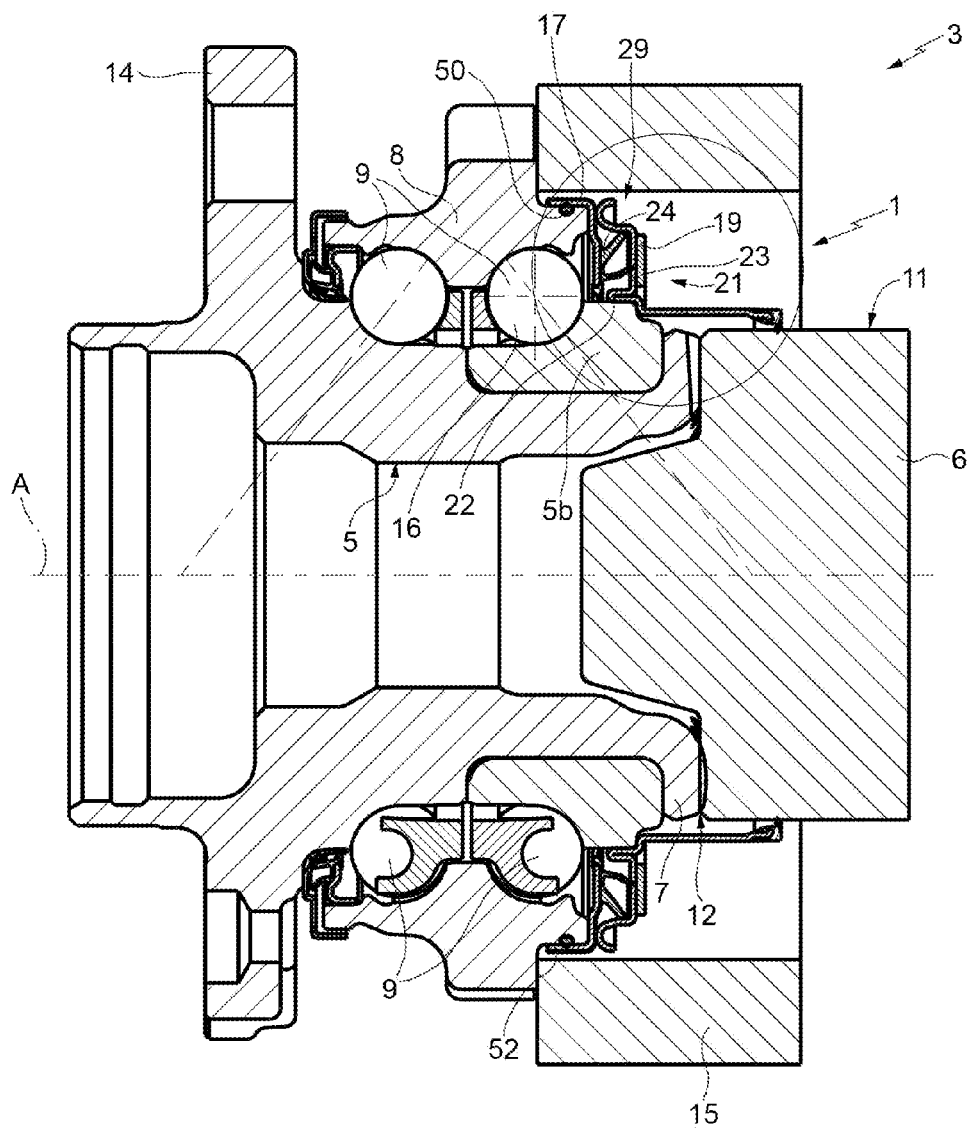
With reference to FIGS. 1 and 2, it is indicated as a whole with 1 a sealing device for a wheel hub assembly 3 comprising an inner ring 5, which is operatively associated with a constant velocity joint 6, known and therefore illustrated only schematically for simplicity, to rotate integrally thereto. The wheel hub assembly 3 further comprises an outer ring 8 mounted coaxial and concentric to the ring 5, radially on the outside of the ring 5, and a plurality of rolling bodies 9 interposed between the rings 5 and 8 permitting them to be relatively rotatable about a common symmetry axis A.

The inner ring 5 comprises a ring 5b (insert ring or "SIR"), produced as an independent element axially blocked by a rolled edge 7 and externally delimited by a radially outer cylindrical lateral surface 10 (FIG. 2), while the constant velocity joint 6 is provided with a radially outer cylindrical lateral surface 11 (FIG. 2), substantially coaxial with the ring 5, and with a frontal toothing toothed coupling 12 with the inner ring 5, formed on mutually adjacent portions 13 of the edge 7 and the constant velocity joint 6.

The inner ring 5 is provided on the side opposite to the constant velocity joint 6 with a flange 14 for receiving a vehicle wheel, not illustrated for simplicity and the outer ring 8 is adapted to be rigidly connected, in use, with an upright 15 of a vehicle suspension, known and not illustrated for simplicity.

The sealing device 1 is intended to be interposed between the inner ring 5 and the outer ring 8 of wheel hub assembly 3, and to extend straddling between the wheel hub 3 and the constant velocity joint 6.

For this purpose, the sealing device 1 comprises a first annular shield 16, stationary in use, and a second annular shield 21, rotating in use, adapted to be anchored by means of respective annular journalling sleeve-shaped portions 17 and 22 to the outer ring 8 and to the inner ring 5 of the wheel hub assembly 3 respectively, and having a common symmetry axis coinciding with the symmetry and relative rotation axis A of the rings 5 and 8.

The shield 16 has furthermore an annular flange portion 18 which radially extends in cantilever fashion from the journalling portion 17 and towards the shield 21; the shield 21, likewise, has an annular flange portion 23 which radially extends in cantilever fashion from the journalling portion 22 and towards the shield 16, in particular the flange portion 23 extends radially on the outside of the journalling portion 22 and on the side opposite to the flange portion 18; the flange portions 18 and 23 are in particular arranged one in front of the other throughout their radial extension.

The flange portion 23 of the second shield 21 carries on the side opposite to the first shield 16 and, in use, towards the constant velocity joint 6 an annular signal generating element 19, also known as impulse ring or phonic wheel, made of a synthetic plastic or magnetizable elastomeric material, which has been magnetized in an alternating way, by means of magnetized and non-magnetized areas, or magnetized with opposite polarity.

The annular element 19 is rigidly fixed to a face 20 of the flange portion 23 facing the side opposite to the shield 16, for example the impulse ring 19 is fixed integral to the face 20 by gluing during the curing step.

The sealing device 1 further comprises an annular elastomeric sealing element 24 carried integral by the first shield 16, to which has been integrally fixed by gluing during the curing step, and which is provided with a plurality of annular sealing lips 25, 26 and 27.

According to a first aspect of the invention, the annular journalling portion 17 of the first shield 16 is intended to fluid-tightly couple, in use, radially on the outside of the outer ring 8 of wheel hub 3 assembly; for this purpose, according to the invention, the flange portion 18 extends in cantilever fashion radially on the inside of the annular journalling portion 17; in particular, the flange portion 18 extends towards the axis A from one end 28 of the journalling portion 17, end 28 which is arranged on the side facing towards the shield 21 and, in use, i.e. in the wheel hub assembly 3 considered as a whole, towards the constant velocity joint 6.

According to a further aspect of the invention, in combination with the described arrangement of the flange portion 18, the flange portion 23 of the second shield 21 comprises a first, radially external, annular stretch 29 radially opposite to the journalling portion 22, and a second, radially internal, annular stretch 35 immediately adjacent to the journalling portion 22.

The annular stretch 29 axially extends in cantilever fashion from the annular stretch 35 defining the rest of the flange portion 23, and on the same side of the annular journalling portion 22; in this case, both the annular stretch 29 and the journalling portion 22 axially extend in cantilevered fashion with respect to the flange 23, in particular with respect to the annular stretch 35 thereof, towards the first shield 16.

The annular stretch 29 is peripherally external and is incurved radially from the exterior towards the interior and on the side opposite to the first shield 16 to form in radial section a U arranged parallel to the common symmetry axis A of the first annular shield 16 and of the second annular shield 21 and having a concavity 30 thereof facing the side opposite to the first shield 16, to form on the side of the signal generating element 19 and radially on the outside of the signal generating element 19, a curved bottom annular channel 31.

The annular channel 31, being carried by the flange portion 23 of the annular shield 21 which also carries the signal generating element 19 on the side opposite to the axial extent direction of the annular stretch 29, is rotating, in use, along the inner ring 5.

The annular stretch 29 is furthermore formed so that a terminal annular edge 32 of the annular stretch 29 of the flange portion 23 is arranged on the side opposite to, and radially flush with, the annular journalling portion 17 of the first shield 16; in other words, the outer diameters of the annular edge 32 and of the sleeve-shaped journalling portion 17 are substantially identical.

Finally, always according to the invention and in combination with what has already been described, a curved bottom wall 33 of the annular channel 31 formed by the annular stretch 29 of the flange portion 23 cooperates without contact with the flange portion 18, facing thereto, of the first shield 16 to form with the flange portion 18, in a radial position which is innermost than the radial position of the annular journalling portion 17 of the first shield 16, a first labyrinth seal 34 directed radially, since it is defined by a predetermined and relatively small axial gap present between the radial wall 33 and the flange portion 18, also radially directed.

In particular, the labyrinth seal 34 radially extends from the end 28 of the journalling portion 17 and up to a radially inner end 36 of the annular stretch 29; the end 36 connects the annular stretch 29 with the rest of the flange portion 23 defined by the annular stretch 35 and forms an axially extending substantially cylindrical sleeve which extends axially towards the shield 16 with respect to the annular stretch 35. Therefore, the curved bottom wall 33 is located much closer to the shield 16 of the annular stretch 35, which is substantially flat.

The end 28 is curved and has a curvature substantially opposite to the curvature of the bottom wall 33. Consequently, the labyrinth seal 34 is funnel-shaped radially towards the exterior and therefore, in use, towards the direction of possible entry of external contaminants.

According to another aspect of the invention, the annular lips 25,26 and 27 are formed on the annular sealing element 24 radially in sequence; the annular lip 25 is radially outermost and radially and axially extends in cantilever fashion from the first shield 16 and towards the second shield 21 so as to move obliquely away from the symmetry axis A; moreover the lip 25 is arranged radially on the inside of the annular stretch 29 of the flange portion 23 to form a V-shaped annular channel 37 facing radially towards the exterior and arranged in radial section immediately below the annular stretch 29; the annular channel 37 forms a drip course accessible only through the labyrinth seal 34, since it is arranged within an annular chamber 38 defined between the first shield 16 and the second shield 21.

A free end 39 of the annular lip 25 forms with the radially inner end 36 of the annular stretch 29, and inside the annular chamber 38, a second labyrinth seal 40, which is axially directed, i.e. has an extension in the axial direction, and which is directly facing the annular channel 37. In particular, the labyrinth seal 40 is defined by a radial gap between the sleeve-shaped end 36 of the annular stretch 29 and an annular flat surface 41 parallel to the symmetry axis A and facing the end 36, which delimits the free end 39 of the annular lip 25; the surface 41 and the end 36 cooperate for the whole extension of the axial surface 41 to form the second labyrinth seal 40.

In this way, the centrifugation effect on external contaminants (water, dust, mud) caused by the rotation in use of the shield 23 is exalted, by multiplying the same, and the ability of the radially outermost labyrinth seal 34 to counteract the entrance of the contaminants non-centrifuged away from the sealing device 1 is greatly enhanced. The contaminants that may still pass the labyrinth seal 34 are intercepted by the annular channel 37 where they are collected because of the obstacle constituted by the second labyrinth seal 40 and from which can then be easily unloaded by gravity, due to the rotation of the shield 23, through the labyrinth seal 34 thanks to the fact that it is radially directed.

The annular journalling sleeve-shaped portion 22 of the shield 23 comprises a first portion defined by a first L-shaped fold 42 which axially extends in cantilever fashion from the flange portion 23 and towards the first shield 16 and a second portion defined by a U-shaped fold 43; the U-shaped fold 43 radially overlaps in contact with the segment defined by the L-shaped fold 41 on the side of the inner ring 5, i.e. radially towards the inside, and extends axially backwards with respect to the L-shaped fold 41, towards the constant velocity joint 6 and beyond the flange portion 23.

In the non-limiting example illustrated, from the second portion defined by the U-shaped fold 43 a third L-shaped fold 44 extends, on the side opposite to the first portion defined by the L-shaped fold 42, integrally formed with the journalling portion 22, in this case with its second portion defined by the third fold 43; the L-shaped fold 44 radially extends towards the inside of the journalling sleeve-shaped portion 22 and is intended to axially extend, in use, in cantilever fashion from the inner ring 5 and, with respect to the flange portion 23, towards the constant velocity joint 6 to form a tubular element 45 coaxial with the inner ring 5 and adapted to be arranged, in use, straddling the wheel hub assembly 3 and the constant velocity joint 6.

The L-shaped fold 44 also defines a first axial thrust shoulder for the assembly of the second shield 21 on the radially outer surface 10 of the inner ring 5.

Figure 2:
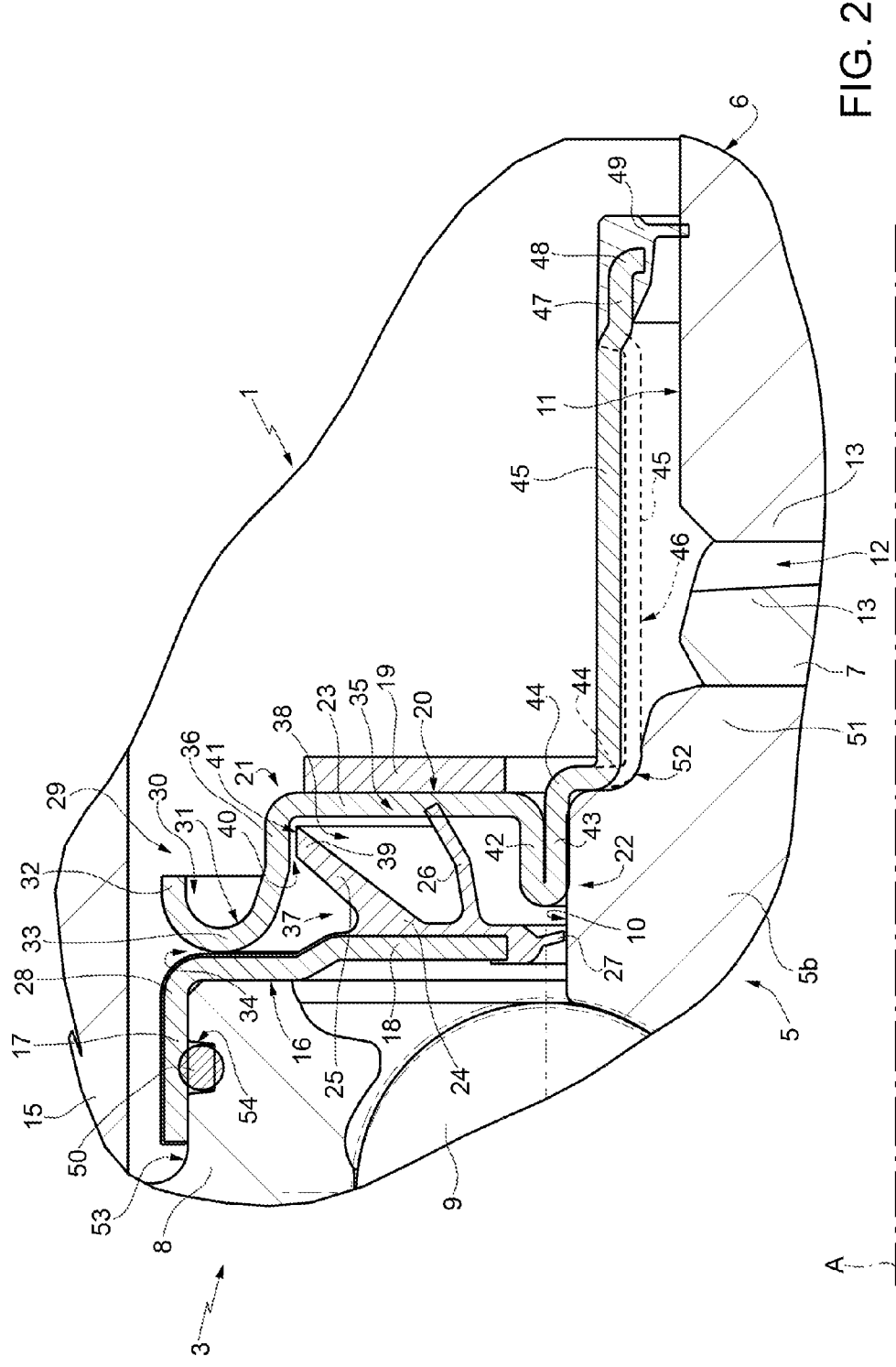

According to a possible alternative, illustrated in dashed lines in the same FIG. 2 for simplicity using the same reference numbers for details similar or identical to those already described, the sealing device 1 may comprise a third annular shield 46 intended, in use, for coupling radially towards the inside of the journalling sleeve-shaped portion 22, which in this case is devoid of the U-shaped fold 43 and is constituted only by the L-shaped fold 42 which is coupled with interference with the lateral surface 10; the shield 46 comprises a L-shaped fold 44 radially facing the exterior and the journalling sleeve-shaped portion 22 defined by the fold 42, and a tubular element 45 coaxial with the inner ring 5 and which extends in cantilever fashion from the L-shaped fold 44; the tubular element 45 is adapted to be arranged, in use, straddling the wheel hub assembly 3 and the constant velocity joint 6 and is intended to be journalled onto the inner ring 5, in axial sequence immediately after the second shield 21 and in a direction that moves away from the first shield 16, to axially extend, in use, in cantilever fashion from the inner ring 5 towards the constant velocity joint 6; the L-shaped fold 44 defines a first axial thrust shoulder for mounting the third shield 46 on one end 51 of the inner ring facing the constant velocity joint, in particular on an annular step 52 formed on the end 51.

According to both the embodiments described, a free end 47 (illustrated as a continuous line for both embodiments) of the tubular element 45, opposite to the L-shaped fold 44, is provided, radially on the inside, of an edge 48 L-folded on the side opposite to a direction of the radial cantilevered extension of the flange portion 23; the L-shaped edge 48 is completely embedded in an annular gasket 49, which cooperates in contact with the lateral surface 11 of the constant velocity joint.

According to a further non-limiting aspect of the invention, the journalling portion 17 of the first shield 16 is adapted to be radially coupled on the outside of the outer ring 8 with the interposition of an O-ring 50 arranged radially on the inside of the journalling portion 17 itself.

A second annular lip 26 of the annular sealing element 24 is formed on the sealing element 24 radially more inner than the lip 25 and extends axially beyond the free end 39 of the annular lip 25 radially on the inside of the annular lip 25, so as to slidingly cooperate, with axial interference, with the flange portion 23 of the shield 21 in a radial position much closer to the journalling portion 22 of the second shield 21 than the free end 39 of the annular lip 25.

It is thus obtained an optimum sealing action while reducing the energy consumption generated by the rotation of the shield 21.

The sealing device 1 described is integrated into the wheel hub assembly 3 and in fact comprises also a stretch of the radially outer lateral surface 10 of the inner ring 5 on which is formed, on the side of the constant velocity joint 6 and at the end 51 of the inner ring facing the constant velocity joint, the annular step 52; the L-shaped fold 44 is accommodated, in both embodiments described, within the annular step 52, arranged axially flush with the signal generating element 19.

The annular sealing element 24 also comprises the lip 27, which radially extends in cantilever fashion on the inside of the annular flange portion 18 of the first shield 16, on the side opposite to the annular journalling portion 17 and radially opposite to the annular journalling portion 22 of the second shield 21. The lip 27 cooperates, without contact, in the illustrated example, with the radially outer lateral surface 10 of the inner ring 5 (in this case of the ring 5*b*); according to an alternative not illustrated for simplicity, the lip 27 can cooperate in contact with the surface 10.

A radially outer lateral surface 53 of the outer ring 8, which is engaged by the annular journalling portion 17 of the first shield 16, is provided with an annular seat 54 for accommodating the O-ring 50 arranged radially on the inside of the annular journalling portion 17 of the first shield 16.

In this way, an arrangement of the hub wheel 3 driven by a constant velocity joint 6 in which there is a greater space for the signal generating element 19 is obtained, thereby ensuring the generation of a magnetic signal being always powerful and reliable; at the same time, not only a drastic reduction of the friction torque generated by the sealing device 1 is obtained, but also a simplification of its components and, above all, a considerably improved sealing action against external contaminants.

All objects of the invention are thus achieved.

What is claimed is:

1. A sealing device for a wheel hub assembly connected to a constant velocity joint and intended to be interposed on at least one of an inner ring and an outer ring of the wheel hub assembly and to extend straddling between the wheel hub assembly and the constant velocity joint; the sealing device comprising:
   a first annular shield, stationary in use, the first annular shield comprising a first shield journalling portion and a first shield flange portion, the first shield journalling portion extending axially and being fixed in a fluid-tight manner to an outer cylindrical surface of the outer ring, the first shield flange portion extending from a first shield journalling portion axial end in a radial direction towards the inner ring, and
   a second annular shield, rotating in use, the second annular shield comprising a second shield journalling portion and a second shield flange portion, the second shield journalling portion being fixed to the inner ring, the second shield flange portion extending from the second shield journalling portion in the radial direction towards the outer ring,
   an annular sealing element carried by the first annular shield and which is provided with a plurality of annular sealing lips; the second shield flange portion carrying, on the side opposite to the first annular shield and in use toward the constant velocity joint, an annular signal generating element made of a synthetic plastic or magnetizable elastomeric material; wherein:
   the second shield flange portion comprises a radially inner annular stretch extending from the second shield journalling portion in a radial direction perpendicular to an axis of rotation and ending at a radially outer end, the radially inner annular stretch extends entirely in the radial direction perpendicular to an axis of rotation, the second shield flange portion further comprising a U-shaped radially outer annular stretch which extends axially toward the first annular shield from the radially outer end of the radially inner annular stretch extending portion and forms a U-shape in cross section, the U-shaped radially outer annular stretch further comprising first and second walls that are generally parallel to each other and parallel to the axis of rotation, the first wall extends axially from the radially outer end of the radially inner annular stretch, the U-shaped radially outer annular stretch further comprising a curved bottom wall being convex with respect to the first annular shield and connecting the first and second walls that are generally parallel, the curved bottom wall cooperating with the first shield flange portion to form a labyrinth seal therebetween, the second wall of the U-shaped radially outer annular stretch having a free end that is axially aligned with the first shield journalling portion,
   a maximum radial distance of the sealing device with respect to the axis of rotation is equal to the radial distances of the first shield journalling portion and the free end of the second wall of the U-shaped radially outer annular stretch such that no portion of the sealing device extends radially past the first shield journalling portion or the free end of the second wall of the U-shaped radially outer annular stretch,
   a first radially outer annular lip of the annular sealing element radially and axially extending in cantilever fashion from the first shield flange portion and toward the second annular shield so as to move obliquely away from the axis of rotation, and being arranged radially inwardly from the first wall of the U-shaped radially outer annular stretch of the second shield flange portion, the first radially outer annular lip forming a V-shaped annular channel facing radially outwardly and arranged in radial section immediately below the curved bottom wall of the U-shaped radially outer annular stretch of the second shield flange portion,
   a first annular lip free end forming, with a radially inner surface of the first wall of the U-shaped radially outer annular stretch, and within an annular chamber delimited between the first and the second annular shields, a second labyrinth seal, which is directed axially, and wherein
   no portion of the sealing device is located within a bearing chamber, the bearing chamber being an area defined radially between an outer surface of the inner ring and an inner surface of the outer ring and defined axially between first and second axial ends of the outer ring.

2. The device according to claim 1, the second shield journalling portion further comprising:
   a first stretch defined by a first L-shaped fold which axially extends in cantilever fashion from the second shield flange portion and toward the first annular shield; and
   a second stretch defined by a U-shaped fold, which radially overlaps in contact with the first stretch defined by the first L-shaped fold on the side of the inner ring and which extends axially backward with respect to the first L-shaped fold, toward the constant velocity joint and beyond the second shield flange portion.

3. The device according to claim 2, wherein:
   a third L-shaped fold extends from the U-shaped fold, on the side opposite to the first stretch, the third L-shaped fold being obtained in one piece with the second stretch and extending radially toward the interior of the second shield journalling portion;
   the third L-shaped fold being intended to axially extend, in use, in cantilever fashion from the inner ring and, with respect to the second shield flange portion, toward the constant velocity joint to form a tubular element adapted to be arranged, in use, straddling the wheel hub assembly and the constant velocity joint, coaxial with the inner ring;
   the third L-shaped fold defining a first thrust shoulder for mounting the second annular shield onto a radially outer surface of the inner ring.

4. The device according to claim 2, further comprising a third annular shield intended, in use, to couple radially toward the interior of the second shield journalling portion;
   a third L-shaped fold facing radially toward the exterior and toward the second shield journalling portion; and a tubular element which extends in cantilever fashion from the third L-shaped fold and is adapted to be arranged, in use, straddling the wheel hub assembly and the constant velocity joint, coaxial with the inner ring and intended to be journalled onto the inner ring, in axial sequence immediately after the second annular shield in a direction which moves away from the first annular shield, to axially extend, in use, in cantilever fashion from the inner ring, toward the constant velocity joint; the third L-shaped fold defining a first thrust shoulder for mounting the third annular shield within an annular step of one end of the inner ring.

5. The device according to claim 3, wherein a tubular element free end is provided, radially on the interior thereof, with an L-shaped edge on the side opposite to a direction of cantilevered radial extension of the second shield flange portion; the L-shaped edge of the free end of the tubular element being entirely embedded in an annular gasket.

6. The device according to claim 1, wherein the first shield journalling portion is adapted to be coupled radially on the outer cylindrical surface of the outer ring with the interposition of an o-ring which is arranged radially on the inside of the first shield journalling portion.

7. The device according to claim 1, wherein the first annular lip free end is delimited by an annular flat surface, wherein the annular flat surface is parallel to the axis of rotation and faces the radially inner surface of the first wall of the U-shaped radially outer annular stretch, with which the annular flat surface cooperates to form the second labyrinth seal.

8. The device according to claim 1, the annular sealing element further comprising a second annular lip which axially extends in cantilever fashion beyond the first annular lip free end and radially on the inside of the first radially outer annular lip so as to slidingly cooperate with the second shield flange portion in a radial position which is radially closer to the second shield journalling portion than to the first annular lip free end.

9. A wheel hub assembly connected with a constant velocity joint, comprising:
   a sealing device comprising:
      a first annular shield, stationary in use, the first annular shield comprising a first shield journalling portion and a first shield flange portion, the first shield journalling portion extending axially and being fixed in a fluid-tight manner to an outer cylindrical surface of an outer ring of the wheel hub assembly, the first shield flange portion extending from a first shield journalling portion axial end in a radial direction towards an inner ring of the wheel hub assembly, and
      a second annular shield, rotating in use, the second annular shield comprising a second shield journalling portion and a second shield flange portion, the second shield journalling portion being fixed to the inner ring, the second shield flange portion extending from the second shield journalling portion in the radial direction towards the outer ring,
      an annular sealing element carried by the first shield and which is provided with a plurality of annular sealing lips; the second shield flange portion carrying, on the side opposite to the first annular shield and in use toward the constant velocity joint, an annular signal generating element made of a synthetic plastic or magnetizable elastomeric material:
      the second shield flange portion comprises a radially inner annular stretch extending from the second shield journalling portion in a radial direction perpendicular to an axis of rotation and ending at a radially outer end, the radially inner annular stretch extends entirely in the radial direction perpendicular to an axis of rotation, the second shield flange portion further comprising a U-shaped radially outer annular stretch which extends axially toward the first annular shield from the radially outer end of the radially inner annular stretch extending portion and forms a U-shape in cross section, the U-shaped radially outer annular stretch further comprising first and second walls that are generally parallel to each other and parallel to the axis of rotation, the first wall extends axially from the radially outer end of the radially inner annular stretch, the U-shaped radially outer annular stretch further comprising a curved bottom wall being convex with respect to the first annular shield and connecting the first and second walls that are generally parallel, the curved bottom wall cooperating with the first shield flange portion to form a labyrinth seal therebetween, the second wall of the U-shaped radially outer annular stretch having a free end that is axially aligned with the first shield journalling portion,
   a maximum radial distance of the sealing device with respect to the axis of rotation is equal to the radial distances of the first shield journalling portion and the free end of the second wall of the U-shaped radially outer annular stretch such that no portion of the sealing device extends radially past the first shield journalling portion or the free end of the second wall of the U-shaped radially outer annular stretch,
   a first radially outer annular lip of the annular sealing element radially and axially extending in cantilever fashion from the first shield flange portion and toward the second annular shield so as to move obliquely away from the axis of rotation, and being arranged radially inwardly from the first wall of the U-shaped radially outer annular stretch of the second shield flange portion, the first radially outer annular lip forming a V-shaped annular channel facing radially outwardly and arranged in radial section immediately below the curved bottom wall of the U-shaped radially outer annular stretch of the second shield flange portion,
   a first annular lip free end forming, with a radially inner surface of the first wall of the U-shaped radially outer annular stretch, and within an annular chamber delimited between the first and the second annular shields, a second labyrinth seal, which is directed axially, and wherein
   no portion of the sealing device is located within a bearing chamber, the bearing chamber being an area defined radially between an outer surface of the inner ring and an inner surface of the outer ring and defined axially between first and second axial ends of the outer ring
   a stretch of a radially outer lateral surface of the inner ring on which an annular step is obtained on the side of the constant velocity joint and at an end of the inner ring facing the constant velocity joint; and
   a third L-shaped fold being accommodated within the annular step and arranged axially flush with the annular signal generating element,
   wherein the sealing device is integral between the wheel hub assembly and the constant velocity joint.

10. The wheel hub assembly according to claim 9, the annular sealing element further comprising a second lip, which radially extends in cantilever fashion on the inside of the first shield flange portion, on the side opposite to the first shield journalling portion and radially in front of the second shield journalling portion, to cooperate with the radially outer lateral surface of the inner ring; and the outer cylindrical surface of the outer ring, which is engaged by the first shield journalling portion, being provided with an annular accommodating seat for an o-ring arranged radially on the inside of the first shield journalling portion.

* * * * *